US012641044B2

(12) United States Patent
Boyd et al.

(10) Patent No.: US 12,641,044 B2
(45) Date of Patent: May 26, 2026

(54) PRESENTATION OF MEDIA CONTENT AS FLASHBACKS

(71) Applicant: Snap Inc., Santa Monica, CA (US)

(72) Inventors: Nathan Kenneth Boyd, Los Angeles, CA (US); Marc Brown, New York, NY (US); Hao Long, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 278 days.

(21) Appl. No.: 18/348,195

(22) Filed: Jul. 6, 2023

(65) Prior Publication Data

US 2025/0016126 A1 Jan. 9, 2025

(51) Int. Cl.
*H04L 51/10* (2022.01)
*G06F 3/0484* (2022.01)
*G06F 3/0488* (2022.01)
*H04L 51/046* (2022.01)
*H04L 51/216* (2022.01)

(52) U.S. Cl.
CPC ............ *H04L 51/10* (2013.01); *G06F 3/0484* (2013.01); *G06F 3/0488* (2013.01); *H04L 51/046* (2013.01); *H04L 51/216* (2022.05)

(58) Field of Classification Search
CPC ....... H04L 51/216; H04L 51/52; H04L 51/10; G06Q 50/01; G06F 3/048
See application file for complete search history.

(56) References Cited

U.S. PATENT DOCUMENTS 10,439,972 B1 * 10/2019 Spiegel .................. H04L 51/216
10,602,237 B1 * 3/2020 Paul ....................... G06Q 50/01

10,764,221 B1 * 9/2020 Dalonzo ................. H04L 51/52
10,977,297 B1 * 4/2021 Tang .................... G06F 16/4393
11,146,514 B2 * 10/2021 Brandt ................. H04L 51/08
11,347,388 B1 * 5/2022 Holland ................ G06F 3/0485
11,411,908 B1 * 8/2022 Allen ...................... H04L 51/10
11,562,014 B1 * 1/2023 Dermu ................. G06F 16/435
11,610,588 B1 * 3/2023 Grichnik .............. H04L 67/306

(Continued)

FOREIGN PATENT DOCUMENTS

CA 2962822 A1 4/2016
WO WO-2025010264 A1 1/2025

OTHER PUBLICATIONS

Dube, Kayla, "What is Snapchat Plus and Should You Get if", Apr. 9, 2023, https://www.online-tech-tips.com/what-is-snapchat-plus-and-should-you-get-it/ (Year: 2023).*

(Continued)

*Primary Examiner* — Patrick F Riegler

(74) *Attorney, Agent, or Firm* — Schwegman Lundberg & Woessner, P.A.

(57) ABSTRACT

Systems, methods, and computer instructions are provided. The method includes retrieving a first set of a media content transmitted by a plurality of interaction clients based on a chronological order, wherein the first set of media content has been saved as part of communications of ephemeral messages between at least two users of the plurality of interaction clients. The method further includes creating a visual representation of the first set of media content, and causing to display, on at least one of the plurality of interaction clients, the visual representation the first set of media content.

19 Claims, 19 Drawing Sheets

(56) References Cited

U.S. PATENT DOCUMENTS

| | | | | | |
|---|---|---|---|---|---|
| 12,155,618 | B2 * | 11/2024 | Allen | | G06Q 50/01 |
| 12,321,412 | B1 * | 6/2025 | Lee | | G06F 16/958 |
| 2012/0040644 | A1 * | 2/2012 | Naik | | H04N 1/00307 |
| | | | | | 455/412.1 |
| 2015/0156274 | A1 * | 6/2015 | Alten | | G06F 16/16 |
| | | | | | 709/204 |
| 2015/0177922 | A1 * | 6/2015 | Poletto | | G06F 3/0488 |
| | | | | | 715/753 |
| 2016/0034459 | A1 * | 2/2016 | Larsen | | G06F 16/487 |
| | | | | | 707/740 |
| 2016/0062839 | A1 * | 3/2016 | Kapoor | | G06F 11/1446 |
| | | | | | 707/684 |
| 2016/0364120 | A1 * | 12/2016 | Koum | | H04W 4/08 |
| 2017/0055136 | A1 * | 2/2017 | Lee | | H04W 4/12 |
| 2017/0093780 | A1 * | 3/2017 | Lieb | | G06F 16/587 |
| 2017/0187658 | A1 * | 6/2017 | Ryu | | G06F 3/1423 |
| 2018/0241871 | A1 * | 8/2018 | Sarafa | | H04L 51/212 |
| 2018/0295092 | A1 * | 10/2018 | Peiris | | G06Q 50/01 |
| 2018/0351903 | A1 * | 12/2018 | Allen | | G06Q 10/10 |
| 2018/0373794 | A1 * | 12/2018 | Dimson | | G06N 20/00 |
| 2019/0097964 | A1 * | 3/2019 | Martinazzi | | H04L 51/52 |
| 2019/0132405 | A1 * | 5/2019 | Song | | H04L 51/043 |
| 2019/0147056 | A1 * | 5/2019 | Gordon | | G06N 20/00 |
| | | | | | 707/748 |
| 2019/0147057 | A1 * | 5/2019 | Gordon | | G06F 16/24578 |
| | | | | | 707/748 |
| 2019/0147112 | A1 * | 5/2019 | Gordon | | G06N 20/00 |
| | | | | | 706/12 |
| 2019/0188320 | A1 * | 6/2019 | Gordon | | G06N 3/09 |
| 2020/0311120 | A1 * | 10/2020 | Zhao | | G06F 18/23 |
| 2020/0403951 | A1 * | 12/2020 | Kapoor | | H04L 51/216 |
| 2021/0126883 | A1 * | 4/2021 | Choi | | G06F 3/0484 |
| 2021/0359969 | A1 * | 11/2021 | Wang | | G06Q 10/06 |
| 2022/0052975 | A1 | 2/2022 | Voss | | |
| 2022/0179665 | A1 * | 6/2022 | Rathod | | G06F 9/451 |
| 2022/0382443 | A1 * | 12/2022 | Clarke | | G06F 3/0482 |
| 2023/0039684 | A1 * | 2/2023 | Vincent | | G06F 16/44 |
| 2023/0096334 | A1 | 3/2023 | Al Majid et al. | | |
| 2023/0136837 | A1 * | 5/2023 | Kwon | | G06F 3/04883 |
| | | | | | 709/206 |
| 2023/0196479 | A1 * | 6/2023 | Khan | | H04L 63/10 |
| | | | | | 705/319 |
| 2023/0376168 | A1 * | 11/2023 | Ryan | | G06F 16/78 |
| 2024/0171533 | A1 * | 5/2024 | Boyd | | H04L 51/10 |
| 2024/0370944 | A1 * | 11/2024 | Gulati | | G06Q 50/01 |

OTHER PUBLICATIONS

"International Application Serial No. PCT/US2024/036545, International Search Report mailed Nov. 12, 2024", 3 pgs.
"International Application Serial No. PCT/US2024/036545, Written Opinion mailed Nov. 12, 2024", 7 pgs.

* cited by examiner

400

600

604

602

1000

1006

1002

1004

1500

1502

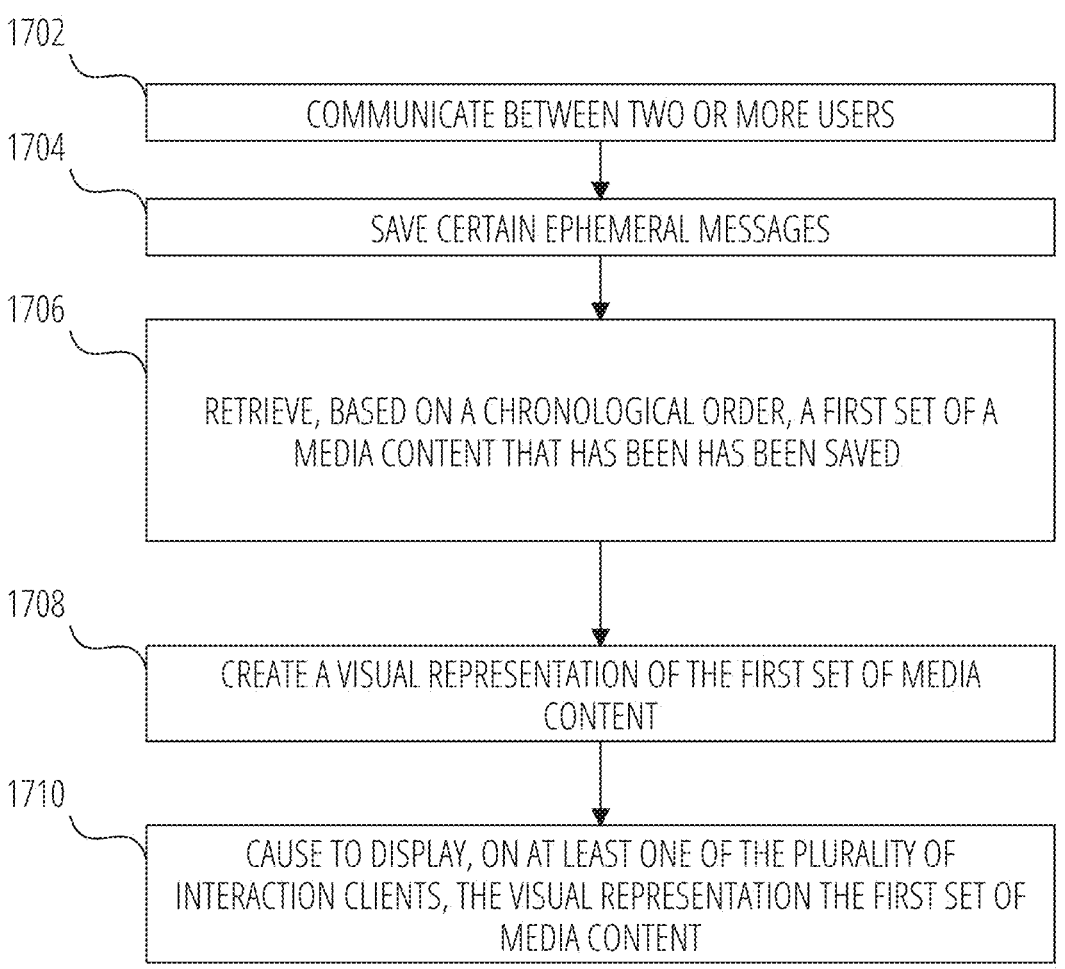

1702 — COMMUNICATE BETWEEN TWO OR MORE USERS

1704 — SAVE CERTAIN EPHEMERAL MESSAGES

1706 — RETRIEVE, BASED ON A CHRONOLOGICAL ORDER, A FIRST SET OF A MEDIA CONTENT THAT HAS BEEN HAS BEEN SAVED

1708 — CREATE A VISUAL REPRESENTATION OF THE FIRST SET OF MEDIA CONTENT

1710 — CAUSE TO DISPLAY, ON AT LEAST ONE OF THE PLURALITY OF INTERACTION CLIENTS, THE VISUAL REPRESENTATION THE FIRST SET OF MEDIA CONTENT

FIG. 17

PRESENTATION OF MEDIA CONTENT AS FLASHBACKS

BACKGROUND

Camera systems, such as a camera disposed on a mobile device, can capture a variety of electronic images and video. The popularity of image and video capture continues to grow. Users increasingly share media content items such as electronic images and videos with each other. Users also increasingly utilize their mobile devices to communicate with each other using message programs. For example, a user can create media content and share it via a message program.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 17 illustrates a process suitable for retrieving and displaying certain group communication items, including media montages, according to some examples.

DETAILED DESCRIPTION

Camera systems are included in a variety of devices such as mobile devices, smart watches, drones, and so on. The camera systems enable a user to take images and video and are communicatively and/or operatively coupled to certain applications, such as interaction clients. In some examples, the interaction client enables a user to capture media content while using the interaction client, and to apply certain photographic filters and/or virtual lenses on the media content. The resulting media content is used to interact with other users, such as users members of a group, via messaging of the media to other users, which can then reply with their own media content. In some examples, the messages are temporal messages accessible for a time-limited duration. Alternatively, the user may save the message as part of a group or friends chat.

The techniques described herein provide for the automated retrieval of messages that have been saved by a group of users (e.g, two or more users). The automatically retrieved messages can include media content captured or created over a certain range of time, such as the past month, the past week, or the past day. The automatically retrieved messages are then used to create a media montage, such as a set of media content having a sequence of media content items that can be played one after another. The interaction client can then notify users of the existence of the new media montage, for example, by changing a group icon used to launch group messaging to now include a visual indicator of the existence of one or more new media montages. The media montages are interactive. That is, the user can "play" media content in the media montage and then interact with the media content by adding to the media montage, editing the media montage, saving the media montage to a local store (e.g., photo album), and/or communicating the media montage to others. By automatically presenting media content from various groups and chats in a more seamless manner, the techniques described herein provide for an interaction client that is more efficient and engaging in collating and communicating media from diverse sources.

Networked Computing Environment

Figure 1:
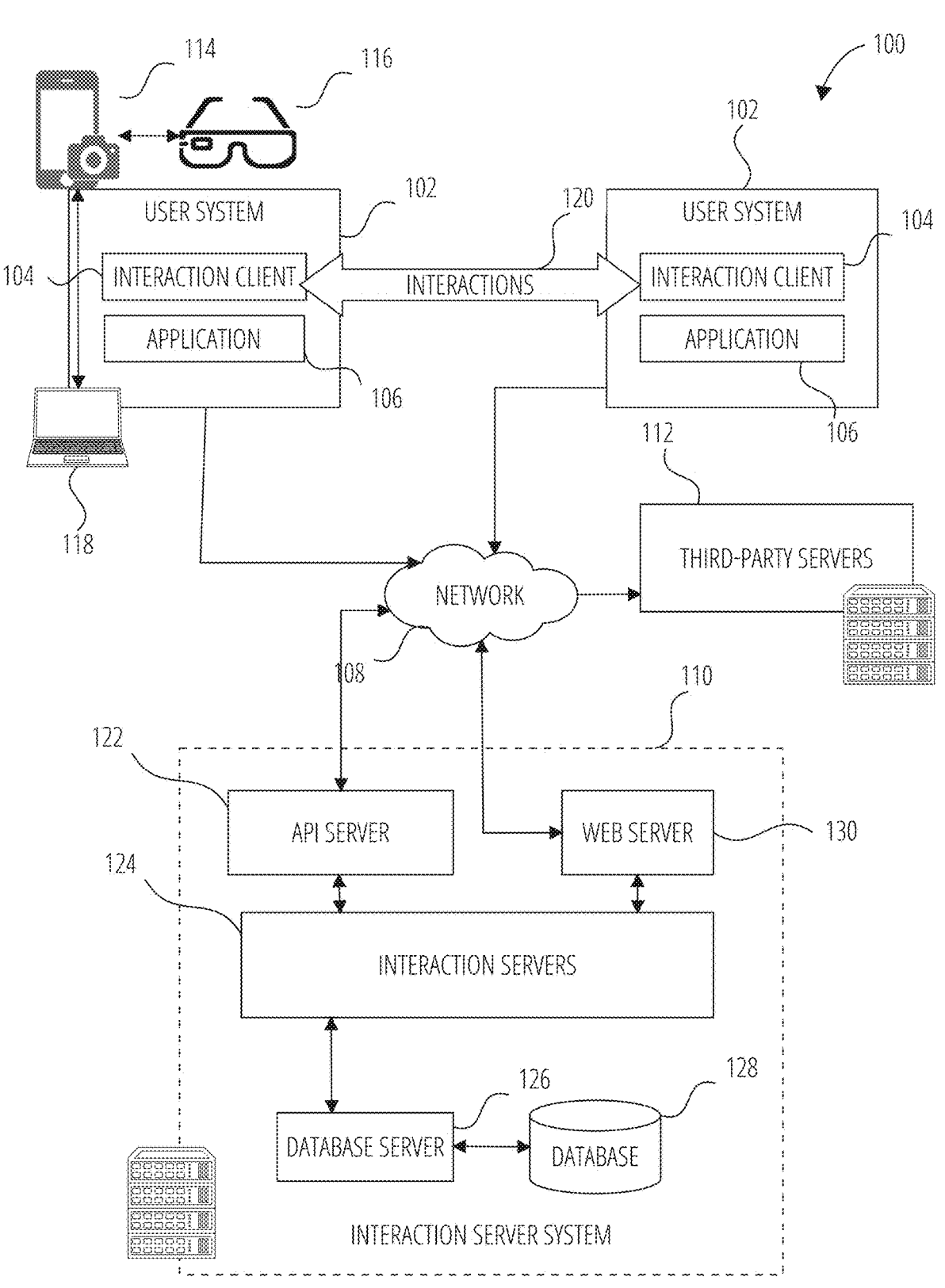
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104). The interaction servers 124 host multiple systems and subsystems, described below with reference to FIG. 2.

System Architecture

Figure 2:
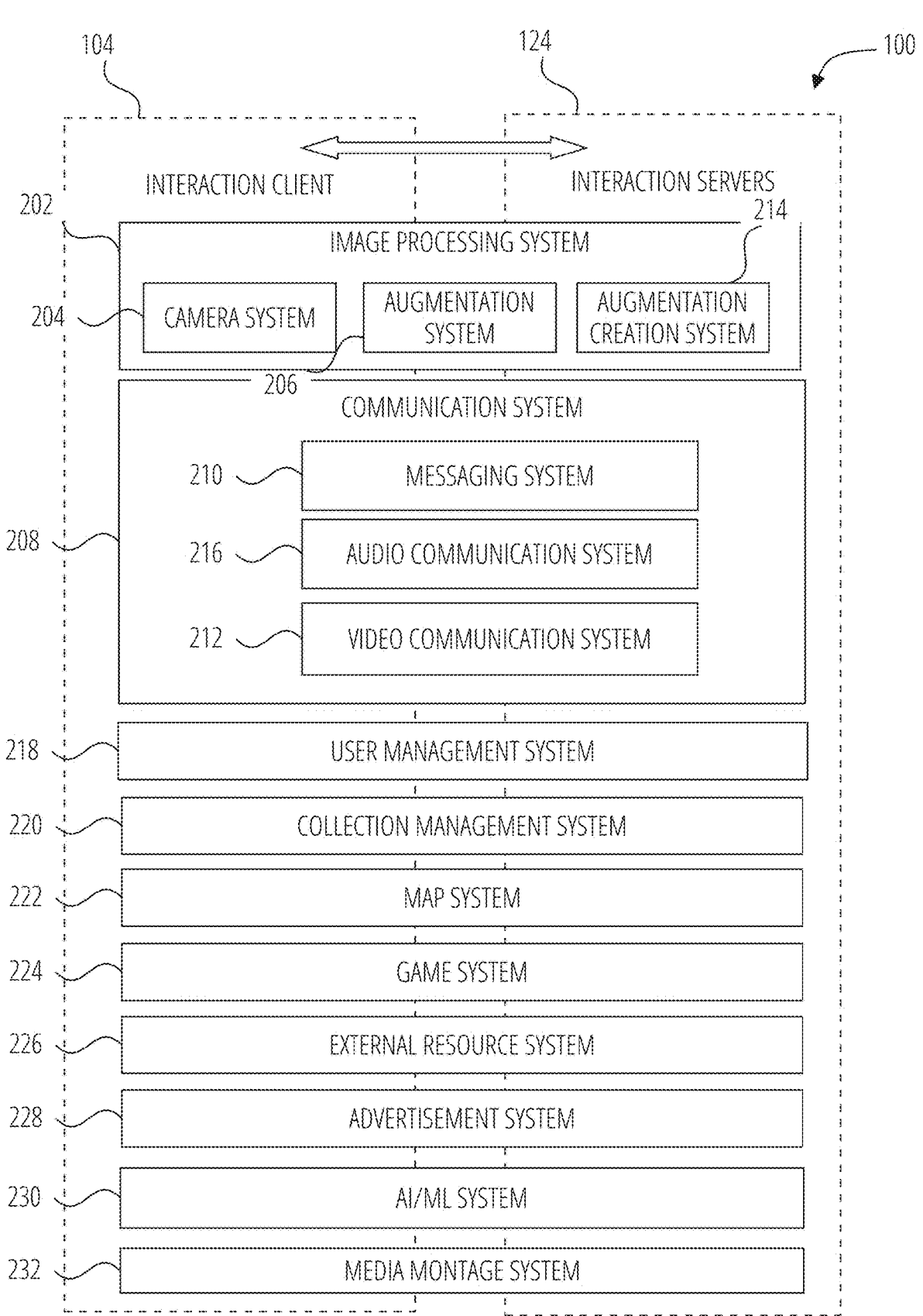
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client

104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

A media montage system 232 provides for the automated retrieval of messages that have been saved by a group of users (e.g, two or more users) and/or managed by the collection management system 220. The automatically retrieved messages can include media content captured or created over a certain range of time, such as the past month, the past week, or the past day. The automatically retrieved messages are then used to create a media montage having a sequence of media content items that can be played one after another via a display of the interaction client 104. The interaction client 104 can then notify users of the existence of the new media montage, for example, by changing a group icon used to launch group messaging to now include a visual indicator of the existence of one or more new media montages. The media montages are interactive, as further described below. By automatically presenting media montages from various groups and chats in a more seamless manner, including collections managed by the collection management system 220, the techniques described herein provide for an interaction client that is more efficient and engaging in collating and communicating media from diverse sources.

Data Architecture

Figure 3:
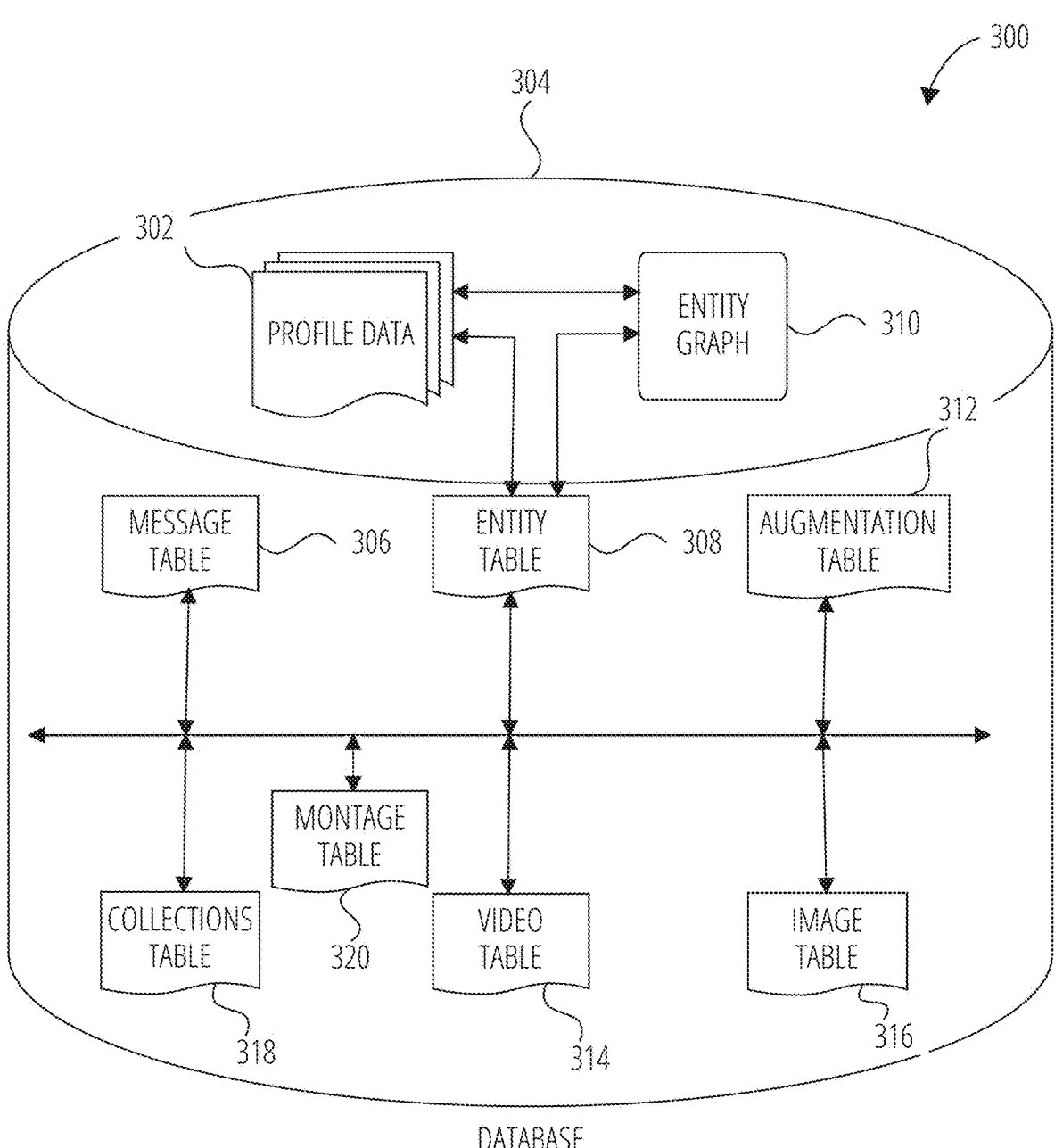
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include a montage table 320. The montage table 320 stores data, such as montage records that are used to store a media montage as a set of media content items having a preferred display order. In some examples, the preferred display order is a date of creation order that displays media content items that have been created most recently first (e.g., newest media content item), followed by the media content item having the next creation date/time, and so on, until the oldest media content item is displayed last. In other examples, the media content items are displayed oldest first newest last, or in a random order.

As mentioned earlier, the media montage system 232 is used to automate the retrieval of messages that have been saved by a group of users (e.g, two or more users) and/or managed by the collection management system 220. The automatically retrieved messages can include media content items captured or created over a certain range of time, such as the past month, the past week, the past day, and so on. The automatically retrieved messages are then used to create a media montage, such as a set of media content items that are saved in the montage table 320. In one example, rather than save the actual media content items themselves, the montage table 320 stores a record identifier for each media content in a montage and the actual media itself is then stored in the image table 316, the video table 314, the message table 306, and/or the collections table 318. A media montage can then be stored as a sequence of record identifiers, which can include a time-based sequence when a timestamp (creation timestamp, modification timestamp) is retrievable for each record identifier. Accordingly, a media montage of media content can be retrieved, based on a time of creation and/or modification (e.g., media content saved the past day, the past week, the past month, and so on).

Data Communications Architecture

Figure 4:
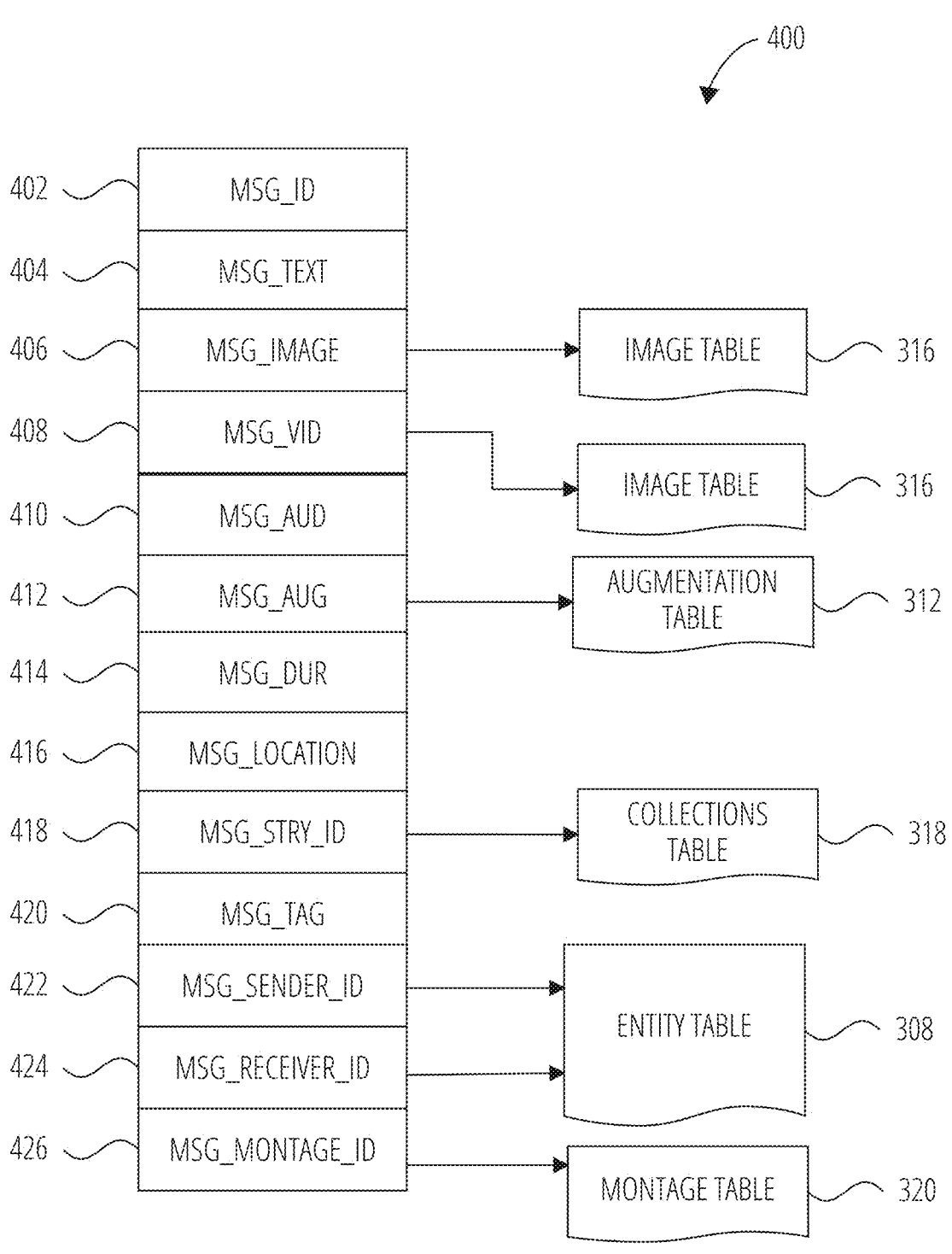
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements)

that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

Message montage identifier 426: an identifier indicative of a media montage stored in the montage table 320 to which the message 400 can point to or otherwise retrieve.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308. Similarly, the message montage identifier 426 may point to montage records stored within the montage table 320.

System with Head-Wearable Apparatus

Figure 5:
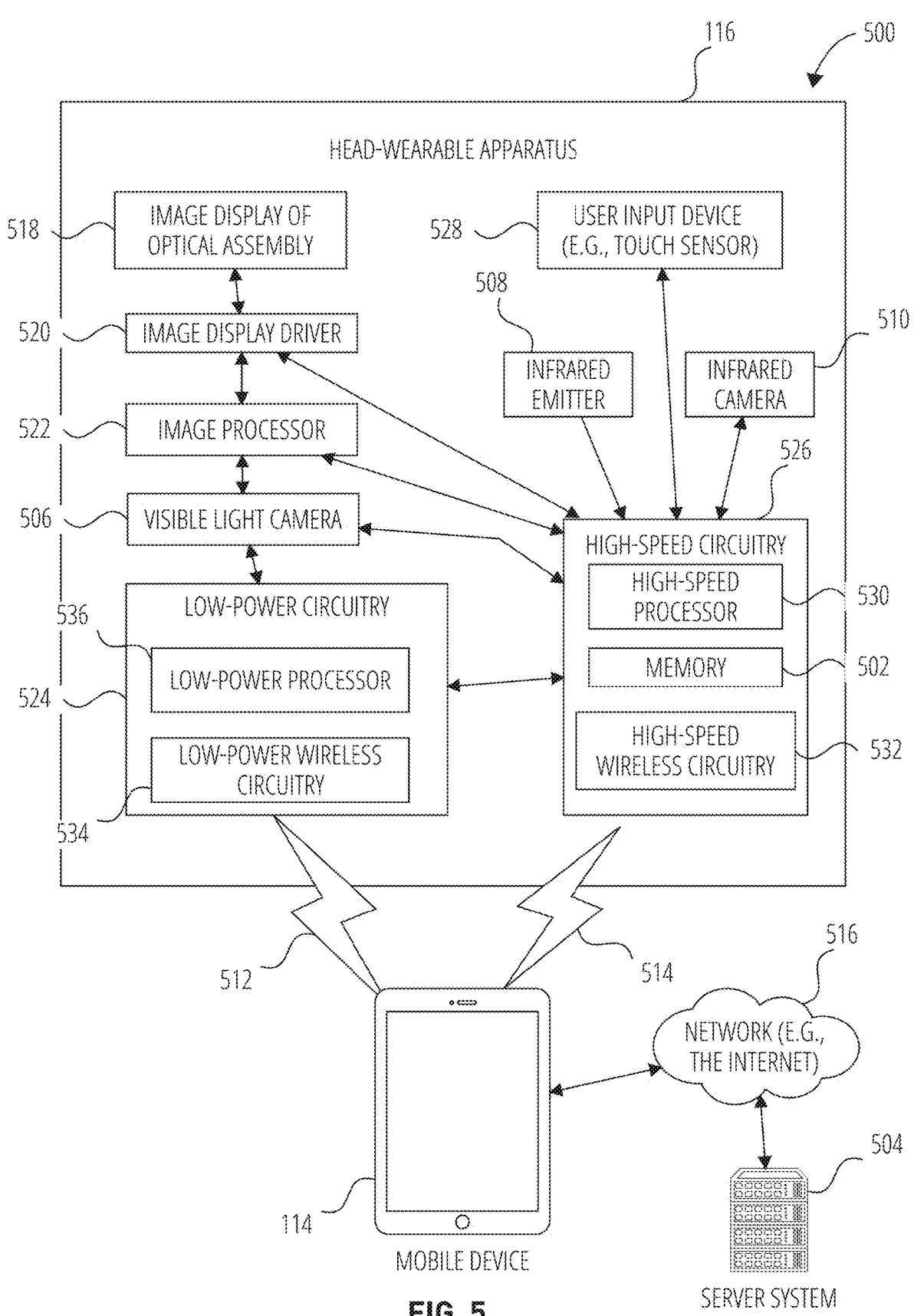
FIG. 5 illustrates a system in which the head-wearable apparatus, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The mobile device 114 connects with head-wearable apparatus 116 using both a low-power wireless connection 512 and a high-speed wireless connection 514. The mobile device 114 is also connected to the server system 504 and the network 516.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WI-FI®. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the mobile device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via the low-power wireless circuitry 534 or high-speed wireless circuitry 532.

Figure 6:
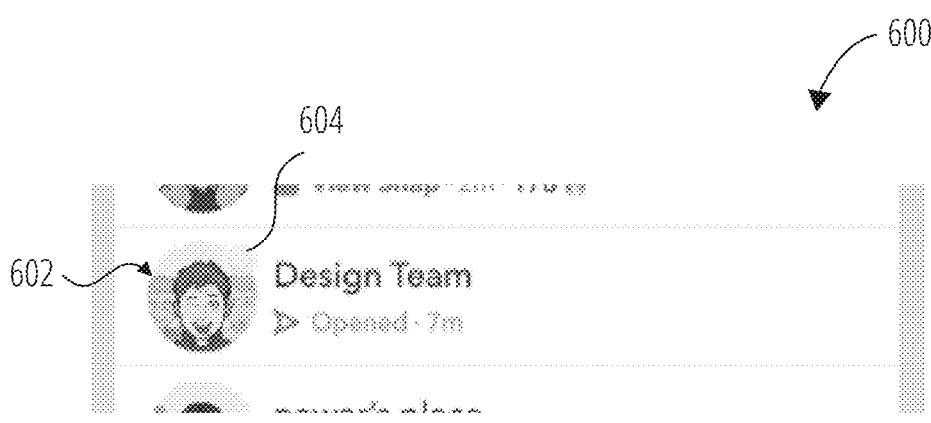
FIG. 6 illustrates an example section of a graphical user interface (GUI) displayable by the an interaction client, according to some examples.

FIG. 6 illustrates an example section 600 of a graphical user interface (GUI) displayable by the interaction client 104, according to some embodiments. In the illustrated example, the interaction client 104 is displaying avatar(s) 602 representative of a group of users. More specifically, the group of users displayed as avatars 602 have been labeled as "design team" members. Text below the group label displays a time since the user of the interaction client 104 has viewed messages from the group. When a new media montage is retrieved or otherwise communicated to the interaction client 104, a visual indication 604 is then displayed, representative of new media montage(s) ready for viewing. The user can then activate the group messaging, for example, by finger tapping the avatar(s) 602. The interaction client 104 will then display a screen, such as a screen shown in FIG. 7, showing the communicated media montage.

Figure 7:
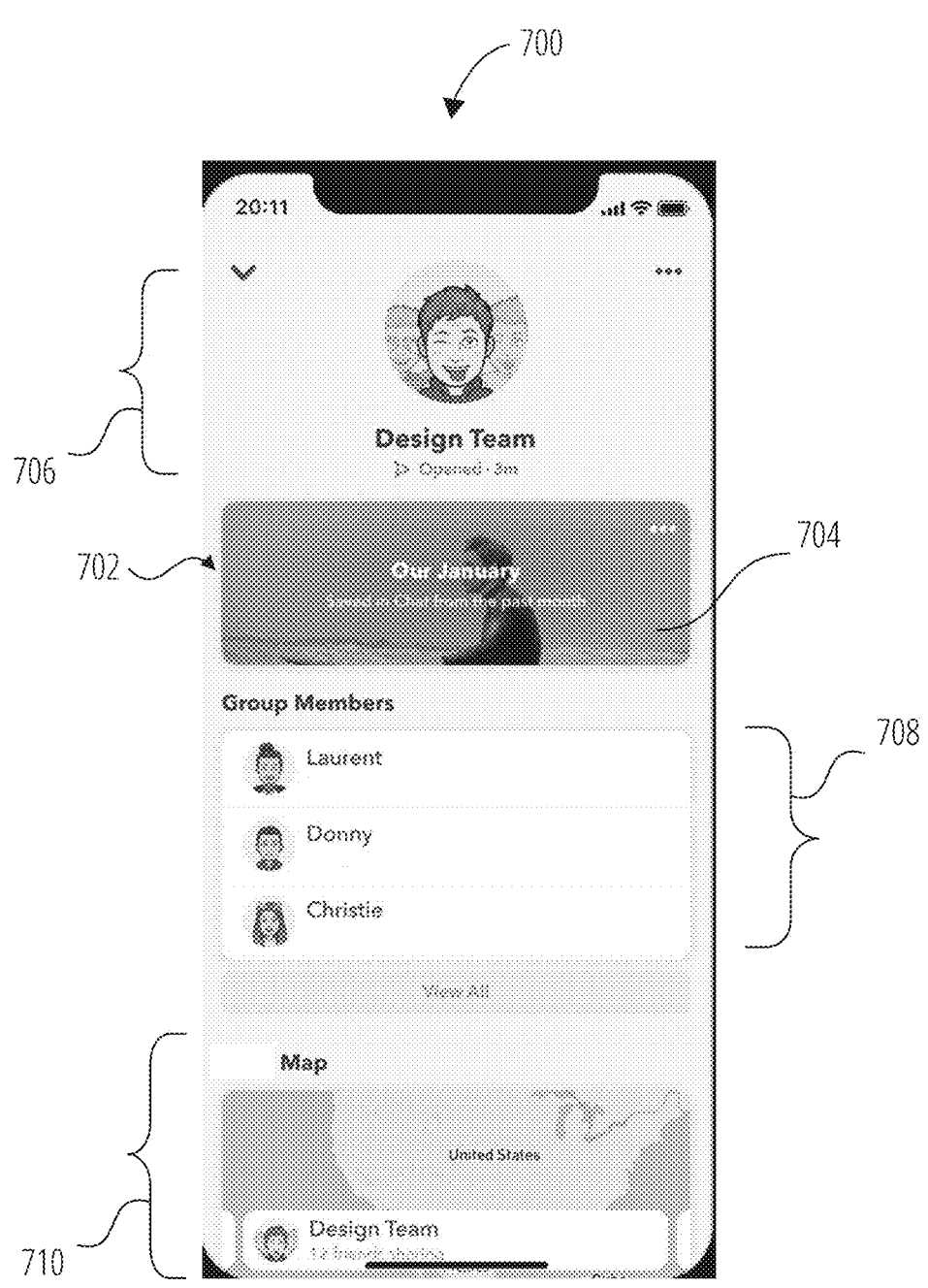
FIG. 7 illustrates is a screenshot depicting an example group chat display screen illustrating a visual representation of a media montage, according to some examples.

FIG. 7 is a screenshot depicting an example display screen 700 illustrating a visual representation of a media montage 702, according to some embodiments. In the depicted example, the visual representation of the media montage 702 is a tile that includes an image 704 representative of a set of media content included in the media montage 702. The visual representation of the media montage 702 also includes a title and a brief description of the media content that is part of the media montage 702. As mentioned above, the media montage 702 includes a set of media content items, such as media content captured and/or created by the interaction client 104, by applications other than the interaction client 104, such as a camera application included in the user system 102, by other applications 106, by external systems, or by a combination thereof. Accordingly, the set of media content included in the media montage 702 can include a set of text, images, video, and/or media overlays.

The display screen 700 additionally includes a section 706 that displays the avatar(s) associated with the group or friend associated with the media montage 702. For example, the section 706 displays the same avatar(s) as displayed in section 600 of FIG. 6. In the depicted example, individual members of the group are displayed in section 708. Additionally, a section (e.g., map section) 710 is shown, and is used to display a location for the individual members of the group that are currently sharing location information with the user of the display screen 700.

Figure 8:
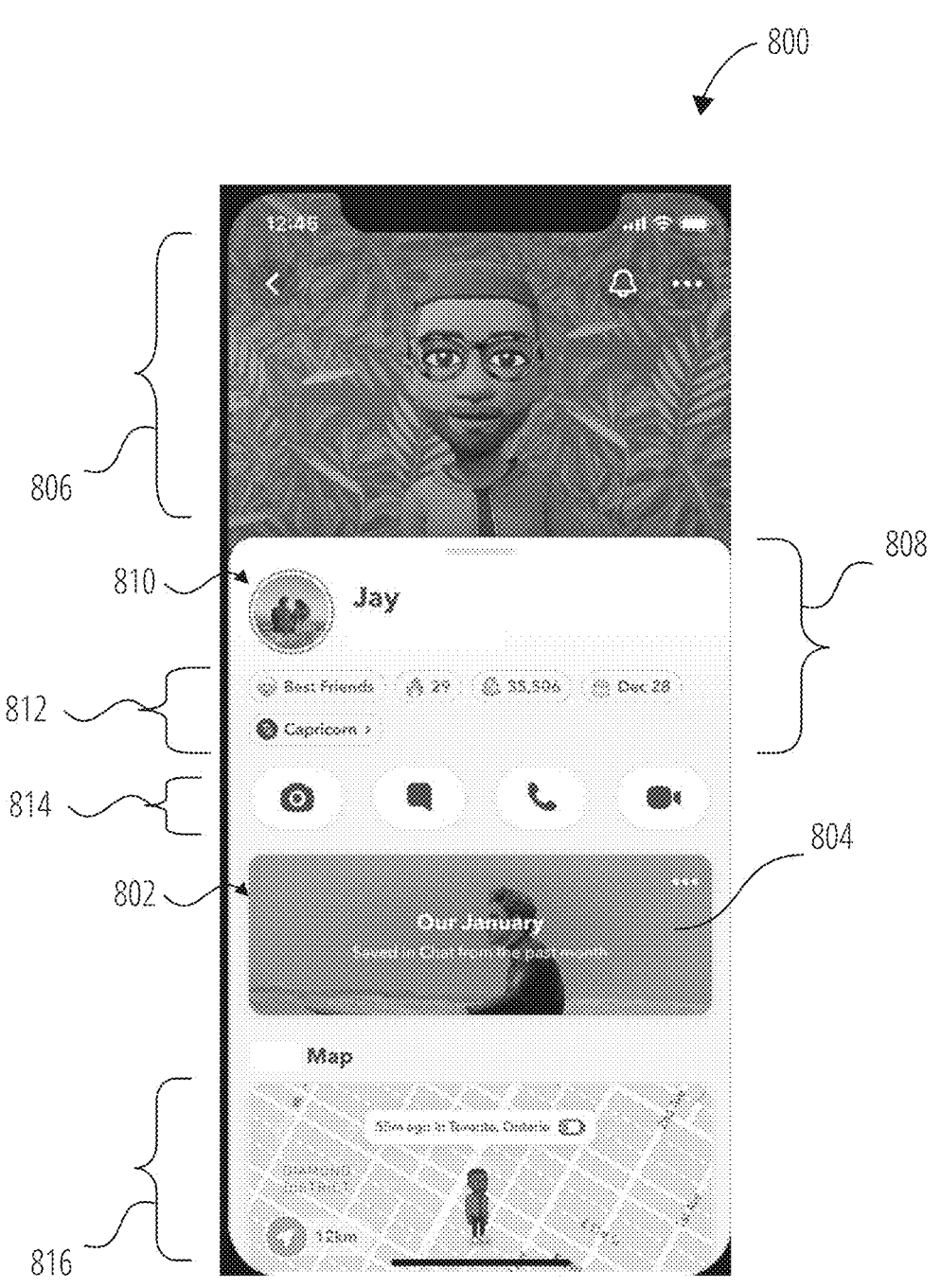
FIG. 8 is a screenshot depicting an example friend display screen illustrating a visual representation of a media montage, according to some examples.

Turning now to FIG. 8, the figure is a screenshot depicting an example display screen 800 illustrating a visual representation of a media montage 802, according to some embodiments. The display screen 800 illustrates using media montages, such as the media montage 802 visualized as a tile, with a single contact or friend as opposed to a group of friends. In the depicted example, the visual representation of the media montage 802, e.g., tile, includes an image 804 representative of a set of media content included in the media montage 802. The visual representation of the media montage 802 also includes a title and a brief description of the media content that is part of the media montage 802. As mentioned above, the media montage 802 includes a set of media content, such as media content captured and/or created by the interaction client 104, by applications other than the interaction client 104, such as a camera application included in the user system 102, by other applications 106, by external systems, or by a combination thereof. Accordingly, the set of media content included in the media montage 802 can include a set of text, images, video, and/or media overlays.

The display screen 800 additionally includes a section 806 that displays a profile picture 810 of the friend associated with the media montage 802, as well as a section 812 displaying certain information about the friend, such as friend type (e.g., best friend), consecutive days communicating with the friend (e.g., 29), number of communications with the friend, friend's birthday, and/or friend's astrological sign, among others. A section 814 displays several icons, that when activated, can be used to take pictures, to communicate via messaging and/or via phone, and to take video. Additionally, a section (e.g., map section) 816 is shown, and is used to display a location for the individual friend if the friend is currently sharing location information with the user of the display screen 800. Various states of a media montage are shown with respect to FIG. 9A, 9B, 9C.

Figure 9A:
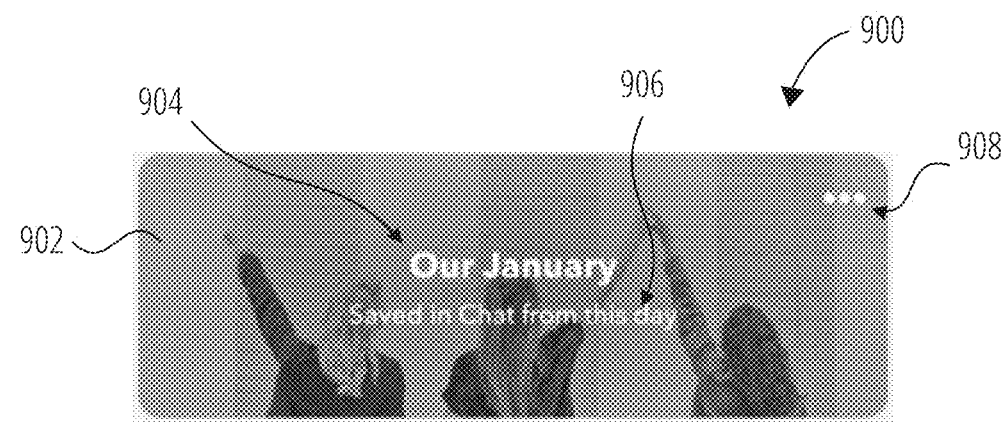
FIG. 9A illustrates a visual representation of a media montage in an unread state, according to some examples.

Turning now to FIG. 9A, the figure shows an example visual representation of a media montage 900, according to some embodiments. In the depicted example, the visual representation of the media montage 900, e.g., tile 900, is in an unread state. In the unread state, media content items included in the media montage 900, such as the displayed image 902, are displayed for a few seconds (e.g., less than 10 seconds) before the next media content item is then displayed or previewed, until all the media content items are previewed or a user activates the media montage 900. Accordingly, by watching a display screen, the user is provided visualizations of all of the media content items included in the media montage 900.

Also shown are a title 904 and a subtitle 906 for the media montage 900. In some examples, the title 904 displays a time (e.g., week, month, year) for media content included in the media montage 900, while the subtitle 906 adds furthers details of the media content. An icon 908 activates other options, for example, by presenting a menu as further described below. The user can view the media content items the media montage 900, for example, by finger tapping anywhere within the image 902.

Figure 9B:
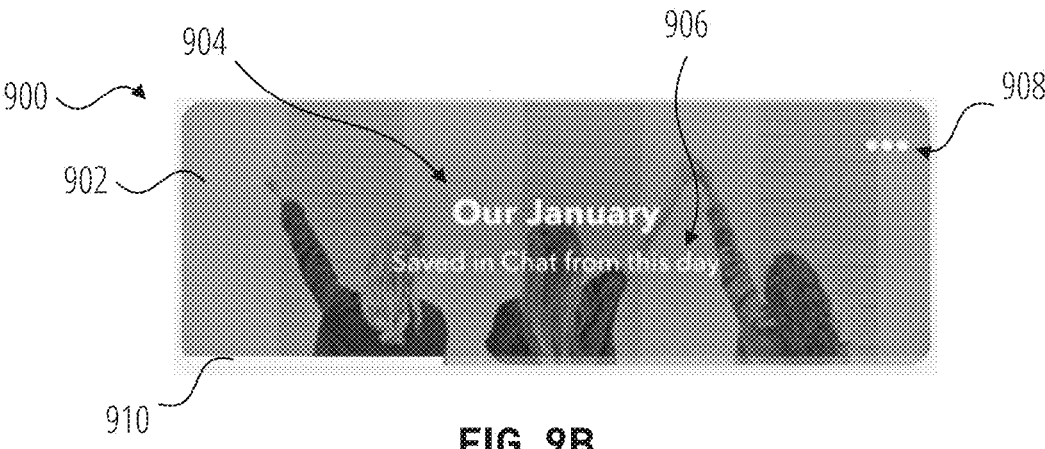
FIG. 9B illustrates a visual representation of a media montage in a partially read state, according to some examples.

FIG. 9B shows an example visual representation of the media montage 900 in a partially read state, according to some embodiments. In the partially read state, some of the media content items included in the media montage 900 have been viewed by the user but there are still one or more media content items that have not been viewed. Accordingly, a progress bar 910 is provided, which tracks viewing progress for the media content items included in the media montage 900. In certain examples, the progress bar 910 spans the length of the image 902 and includes n segments for n media content items. Accordingly, as a media content item is viewed, the corresponding segment of the progress bar 910 is updated to show that the media content is now viewed. In some partially read state examples, the media content items no longer autorotate and show the next media content item. Instead, tapping the image 902 will continue playing the next media montage items. A fully viewed or fully read example of the media montage 910 is then shown in FIG. 9C.

Figure 9C:
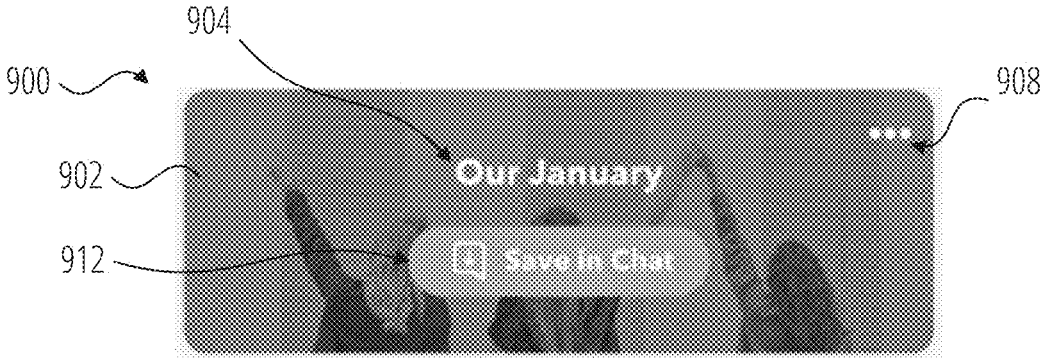
FIG. 9C illustrates a visual representation of a media montage in a fully read state, according to some examples.

FIG. 9C illustrates an example visual representation of the media montage 900 in a fully read state, according to some embodiments. In the fully read state, all of the media content items included in the media montage 900 have been viewed by the user. Accordingly, the progress bar 910 shown in FIG. 9B is removed and a control 912 is now displayed. In certain examples, the control 912 can be activated, for example, to save the media montage as part of a chat. During operations, the user can activate the media content item (e.g., image 902) to show added details. The activated media montage is then shown with respect to FIG. 10.

Figure 10:
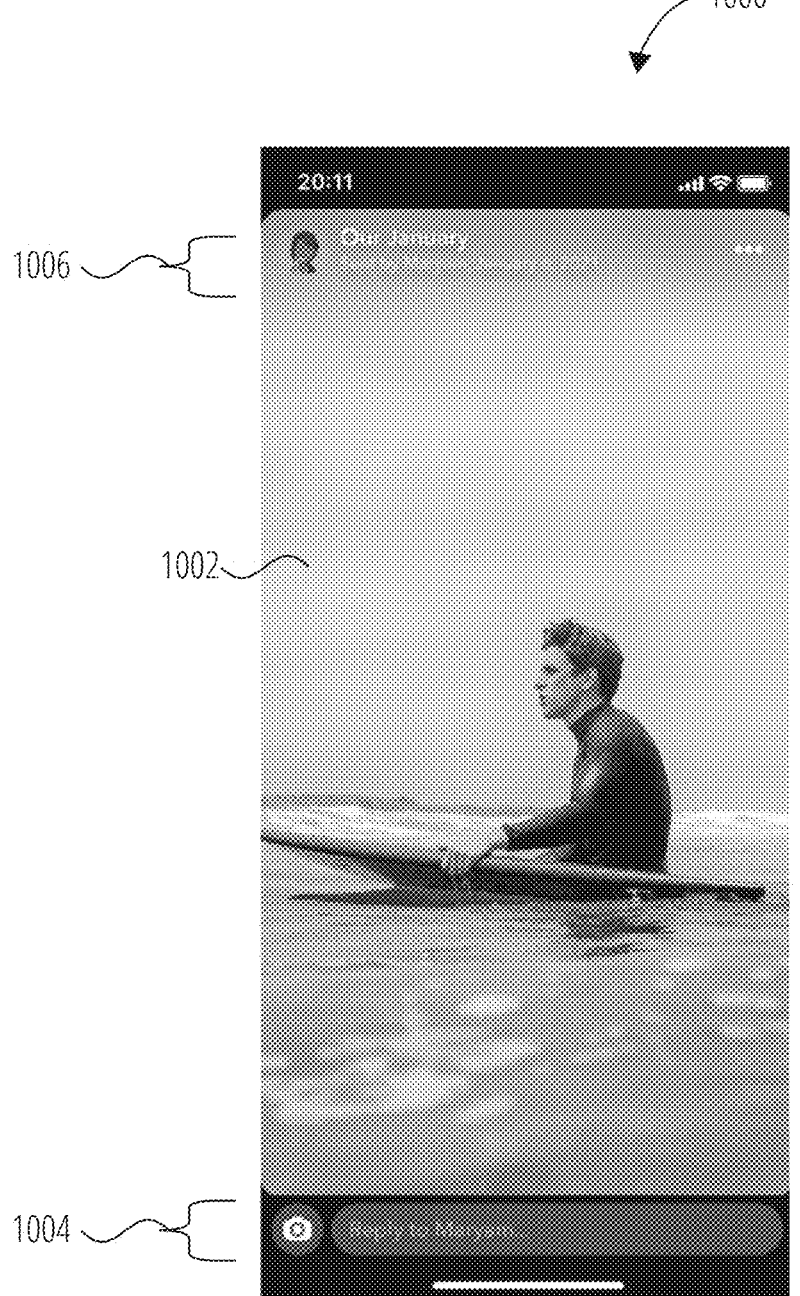
FIG. 10 is a screenshot having a media content that is included in a set of media content of a media montage, according to some examples.

FIG. 10 illustrates a screenshot 1000 having example media content item 1002 that is included in a set of media content of a media montage, such as the media content items 704, 804, according to some embodiments. As mentioned above, activating the media content item will then display more details of the media content item, such as in the illustrated media content item 1002. The media content item 1002 can be displayed as a picture, a video, or a media overlay.

In the depicted embodiment, a section 1006 displays a title for the media montage that includes the media content item 1002, and a section 1004 is used to communicate with the creator of the media content item 1002 and/or with a group of friends related to the media montage having the media content item 1002. For example, the user, can type a message to the creator of the media content item 1002 as shown in FIG. 11, and/or to a group of friends, as shown in FIG. 12.

Figure 11:
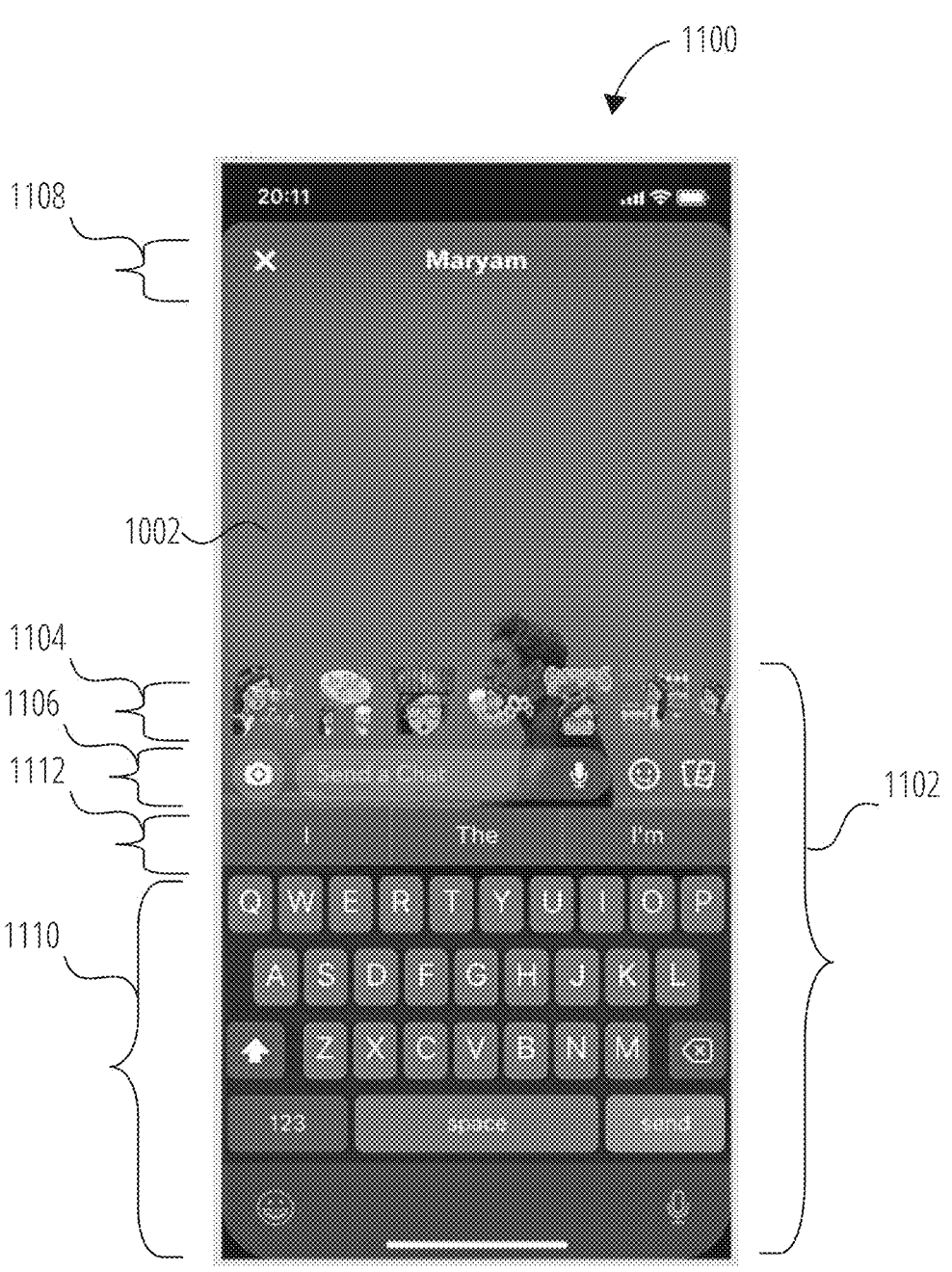
FIG. 11 is screenshot showing a media content with input overlays used to communicate with other users, according to some examples.

FIG. 11 illustrates a screenshot 1100 showing the media content item 1002 with input overlays 1102 used to communicate with other users, according to some embodiments. The input overlays 1102 include a "sticker" section 1104 suitable for adding one or more media such as graphics, text, animation, and so on, to the image 1002. A section 1106 provides for the input of text, pictures, video, and/or emojis, into a message to be sent to another user. The second user's name is displayed as an overly in section 1108. A keyboard section 1110 is used to enter text, including emojis and voice transcription. An autocompletion section 1112 shows text that has been automatically derived to save on typing. The user can then activate a "send" button to communicate the message, including the image 1002, to the second user.

Figure 12:
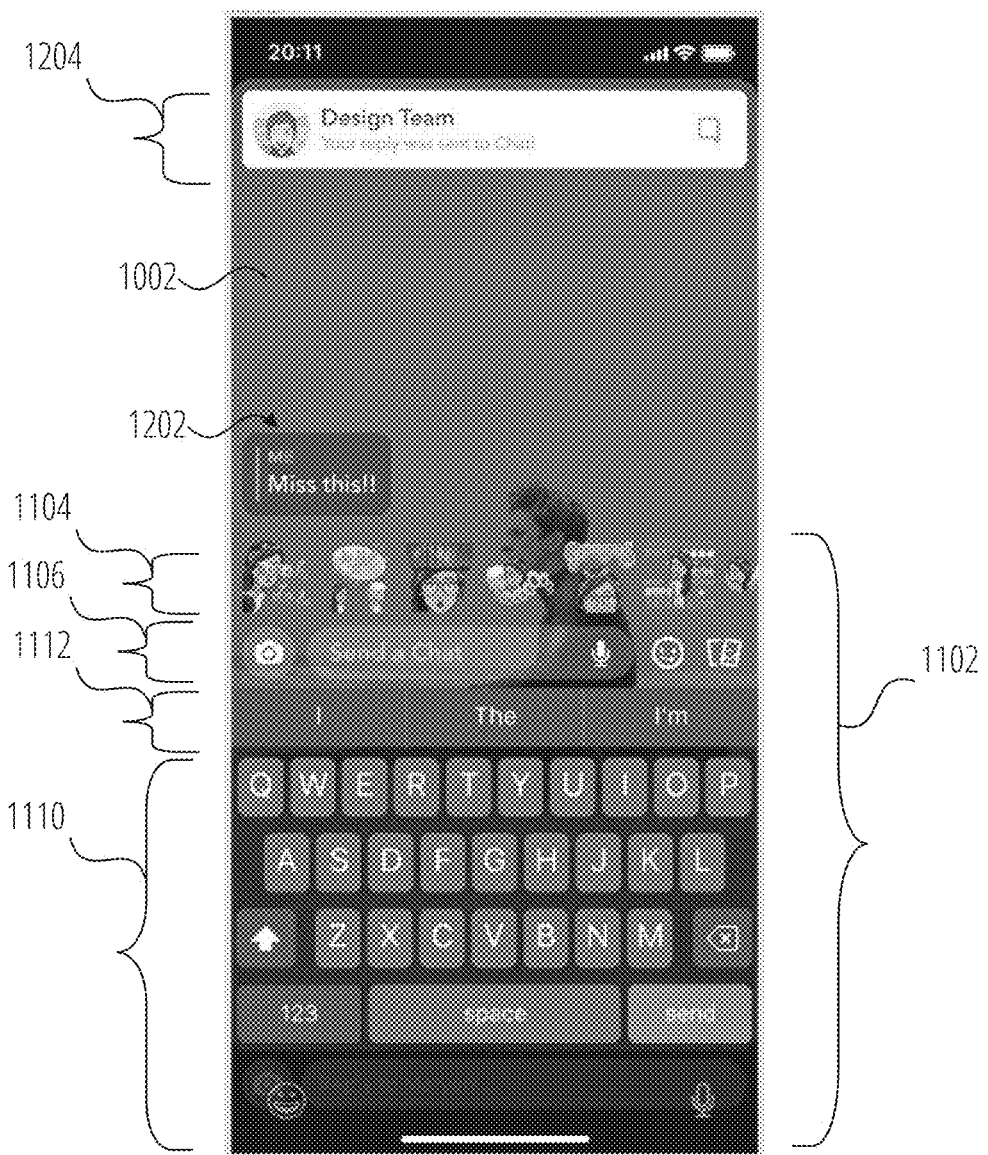
FIG. 12 illustrates a screenshot showing a media content with a communication overlay used to communicate with a group of users, according to some examples.

FIG. 12 illustrates a screenshot 1200 showing the media content item 1002 with a communication overlay 1202 used to communicate with a group of users (e.g., friends), according to some embodiments. The communication overlay 1202 includes a description of the user that is transmitting the communication (e.g., "me" or current user) as well as text, pictures, video, stickers, emojis, and or media overlays transmitted as part of the communication. A section 1204 displays information related to the group of users (e.g., friends) that will be receiving the communication, such as the communication overlay 1202. Also shown is section 1106 providing for the input of text, pictures, video, and/or emojis, into a message to be sent to another user, and input sections 1104, 1106, 1110, 1112 described above. As mentioned earlier, several users can communicate and share the media montage and included media content items, as shown in FIG. 13.

Figure 13:
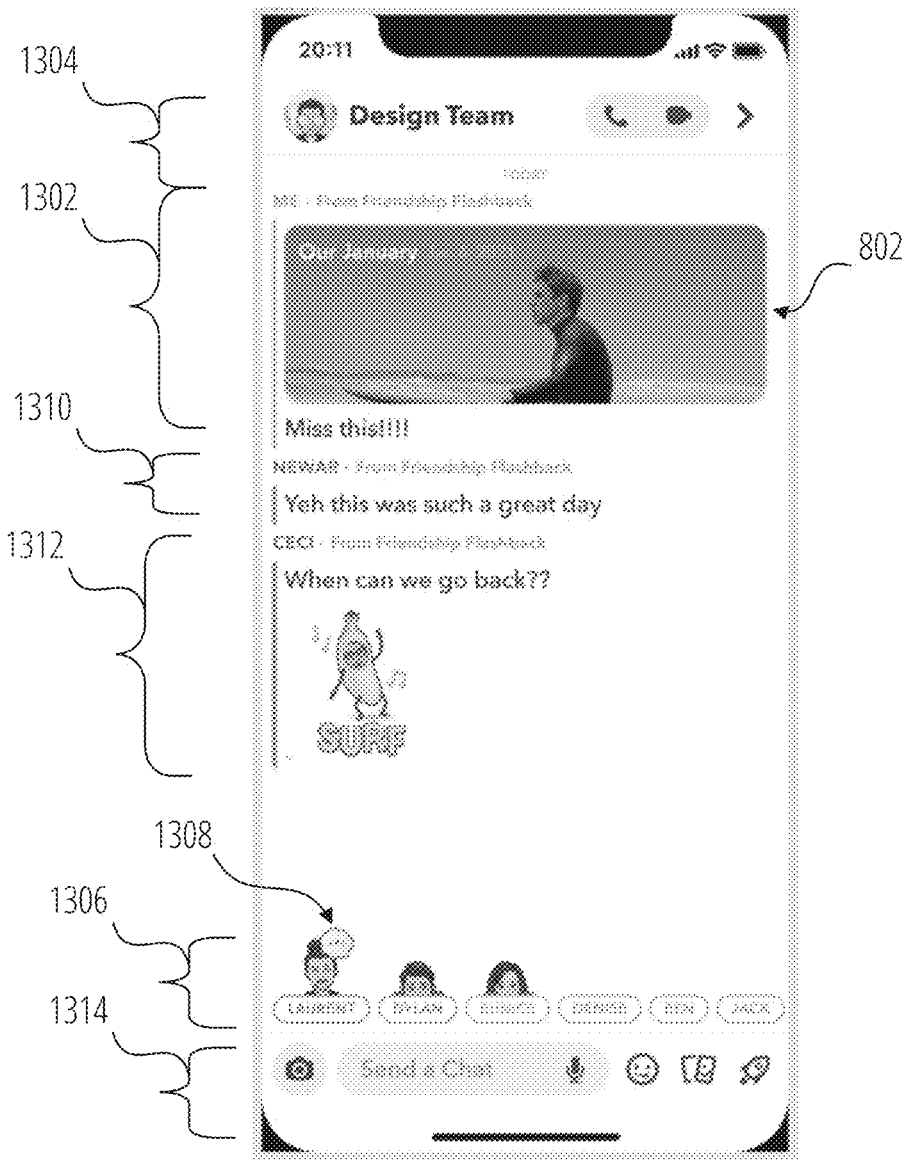
FIG. 13 is screenshot depicting an example group communication or chat, according to some examples.

FIG. 13 is a screenshot 1300 depicting an example group communication or chat, according to some embodiments. In the depicted example, a section 1302 displays the visual representation of the media montage 802 (e.g., tile) as well as a user name of the user that communicated the visual representation of the media montage 802. Section 1302 additionally displays any text and/or media, including media overlays), that were communicated with the visual representation of the media montage 802. A section 1304 displays profile information for the group of users in the communication, for example, by displaying avatar(s) for the group members, the name for group, and related information.

Profile information for the members of the group of users is displayed in section 1306. Each user profile includes the user's name (e.g., first name), the user's avatar, and a visual representation (e.g., cloud with dots icon) 1308 that a user is currently typing or otherwise entering a new communication. The user can scroll through the users listed in section 1306, for example, by swiping left or right to show other users when the number of users is too large to fit in one screen. Communications transmitted by users in the group are shown adjacent to section 1302.

In the depicted example, two additional communication sections 1310 and 1312 are shown. Section 1310 depicts a name of the user that has transmitted the communication, as well as text included in the communication. Section 1312 also includes a name of the user that has transmitted the communication, text included in the communication, and a media content item (e.g., a sticker). Indeed, communications that incorporate visual representations of media montages can additionally include media such as pictures, video, and/or media overlays (e.g., filters, stickers, or other annotations or enhancements). The current user can enter various media to further add to the communications via a section 1314.

Figure 14:
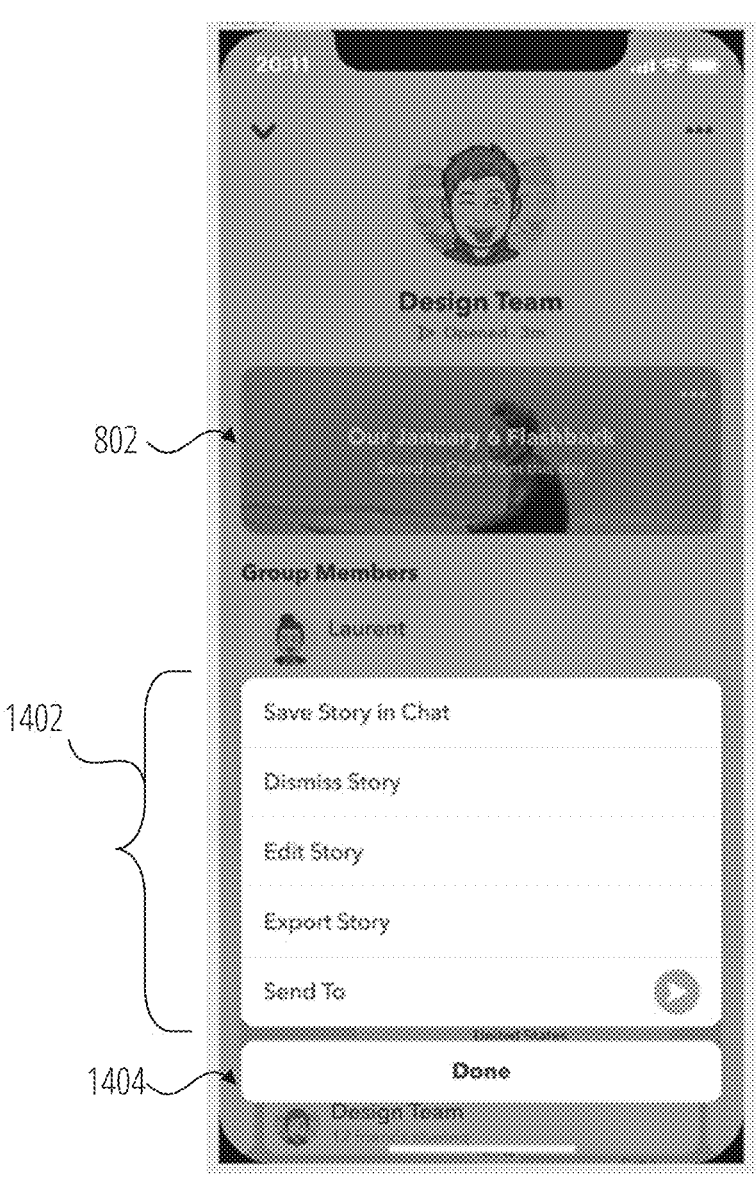
FIG. 14 is a screenshot illustrating an example menu used in editing a media montage, according to some embodiments.

FIG. 14 is a screenshot 1400 illustrating an example menu 1402 used in editing a media montage, according to some embodiments. In the illustrated example, the visual representation of the media montage 802 is displayed on a screen of the interaction client 104. In the depicted example, the screenshot 1400 is showing the same information as screenshot 700 after the user has activated the menu 1402. The user can activate the menu 1402, for example, by pressing and holding the visual representation of the media montage 802 until the menu 1402 appears.

The menu 1402 enables the user to save the media montage 802 as a "story" in the group interactions (e.g., chat) so that, for example, new users entering the group interactions can see and "play" the media montage 820 at a later time. The menu 1402 also includes a "dismiss story" entry, that enables the deletion of the media montage 802. In some embodiments, the deletion of the media montage 802 occurs only for the current user and not for other users that have received the media montage 802. In other embodiments, the deletion of the media montage 802 occurs for all users. In these embodiments, the deletion of the media montage 802 for all users occurs after the interaction client 104 asking the deletor to verify that the deletion should take place for all users. The menu 1402 also includes an "edit story" entry. Editing the story enables, for example, the editing (e.g., updating, inserting, and/or deletion) of all content in the media montage 802, including media content items.

The menu 1402 also provides for an "export story" entry. Exporting the story will save the media montage 802 for use outside of the interaction client 104. For example, the saved story can then be viewed by a media viewer client (e.g., photo app), a web client, stored in a web server, and so on. Also provided by the menu 1402 is a "send to" entry. Sending the story includes selecting one or more users to transmit the media montage 802 to. For example, a contacts list can be presented during the sending process, the user can select one or more contacts and then transmit the media montage 802 to the selected users. The media content items included in each media montage can also be further manipulated after being transmitted, as shown in FIG. 15.

Figure 15:
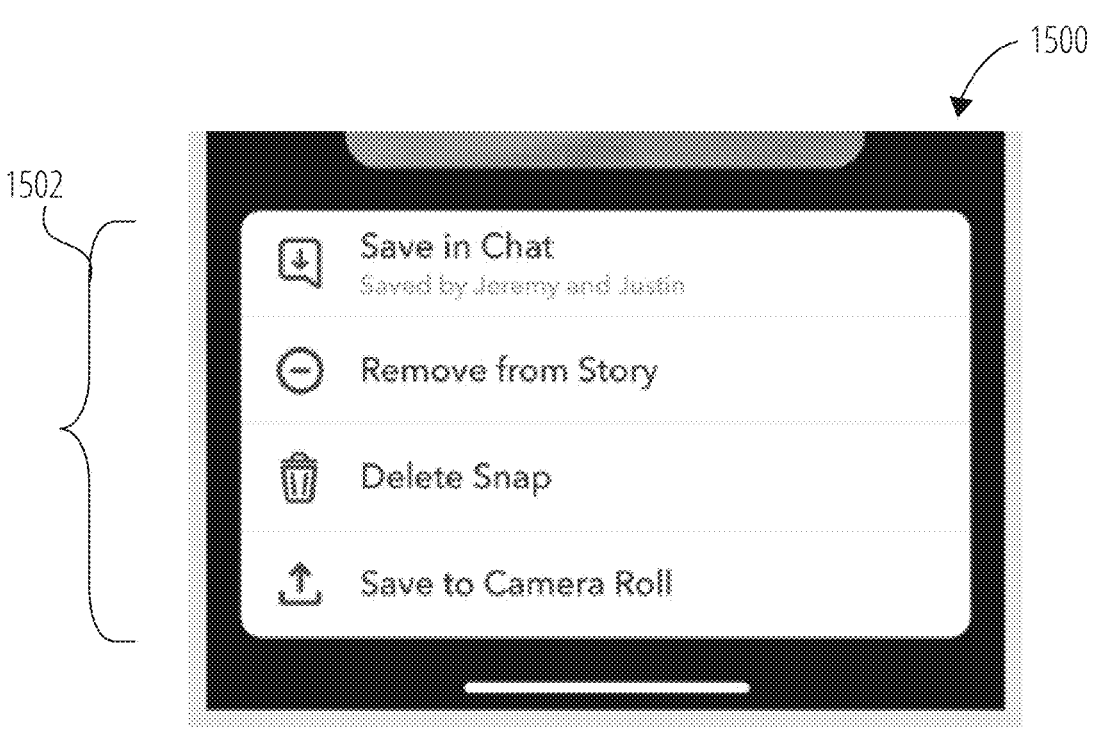
FIG. 15 is a screenshot of a menu that has been activated to take further actions on a media content, according to some examples.

FIG. 15 is a screenshot 1500 of a menu 1502 that has been activated to take further actions on a media content item, according to some embodiments. For example, the user can press and hold onto the image 1002 shown in FIG. 10 and activate the menu 1502. Once activated, the user can then select a menu entry. In the depicted example, the menu 1502 includes a "save in chat" menu entry. Saving the media content item enables the user to save the media content item as a "story" in the group interactions (e.g., chat) so that, for example, new users entering the group interactions can interact with the media content item at a later time. The menu 1502 also includes a "remove from story" menu entry that enables the deletion of the media content item. In some embodiments, the deletion of the media content item occurs only for the current user and not for other users that have received the media content item. In other embodiments, the deletion of the med media content item occurs for all users. In these embodiments, the deletion of the media content item for all users occurs after the interaction client 104 asks the deletor to verify that the deletion should take place for all users. In some embodiments, the deletor of the media content item must also be the user that uploaded the media content item.

The menu 1502 also includes a "delete snap" menu entry. Deleting the snap enables the deletion of the associated media content item from all snaps or stories that may include the media content item. The menu 1502 also includes a "save to camera roll" menu entry that provides for saving the media content item into a storage area of the client device, such as the same storage area used by the client device's camera app.

Figure 16:
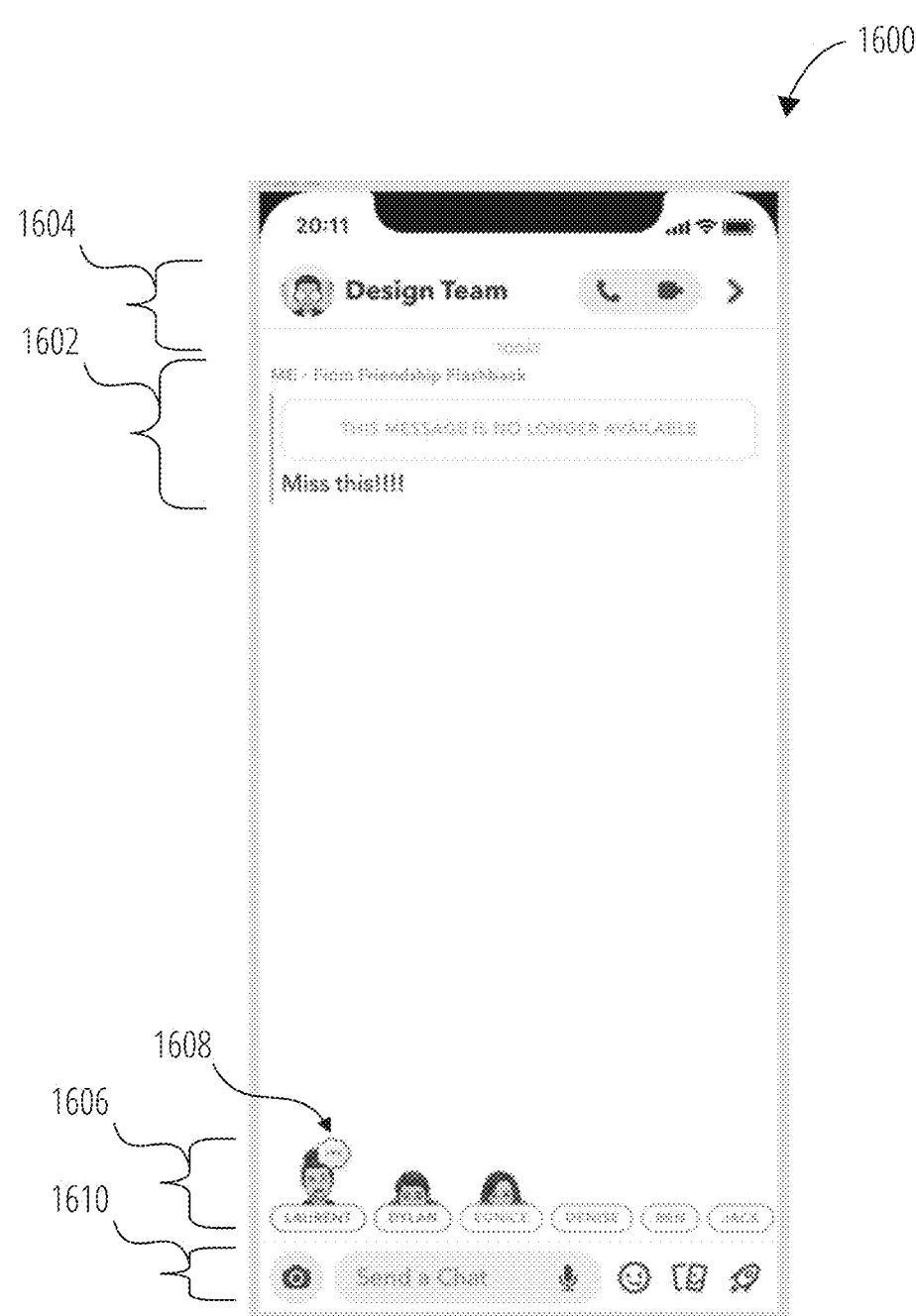
FIG. 16 is a screenshot depicting an example group communication or chat, according to some embodiments.

FIG. 16 is a screenshot 1600 depicting an example group communication or chat, according to some embodiments. The depicted example is similar to the screenshot 1300 shown in FIG. 13 but with the visual representation of the media montage 802 removed. As mentioned earlier, an owner of a media item and/or of a media montage can delete the media item and/or the media montage for individual users participating the group communication or for all users participating in the group communication. For example, the group communication may include 5 users, and the owner of the media item and/or media montage may decided to remove the media item and/or media montage from 3 of the 5 users. Removing media items and/or media montages is provided, for example, via menus such as menus, 1402, 1502, shown in FIGS. 14 and 15, respectively.

In the depicted example, a section 1602 is depicted. The section 1602 shows a previous group communication or chat, and includes a text (e.g., "This Message is No Longer Available") indicative that the media items and/or media montage previously communicated has been removed. Section 1602 also includes previous communications that have not been removed by their respective users, such as a "Miss this!!!!" text.

A section 1604 displays profile information for the group of users in the communication, for example, by displaying avatar(s) for the group members, the name for group, and related information. Profile information for the members of the group of users is displayed in section 1606. Each user profile includes the user's name (e.g., first name), the user's avatar, and a visual representation (e.g., cloud with dots icon) 1608 that a user is currently typing or otherwise entering a new communication. The user can scroll through the users listed in section 1606, for example, by swiping left or right to show other users when the number of users is too large to fit in one screen. The current user can enter various media to further add to the communications via a section 1610. By providing for a visual representation of the removal of content from chats, the techniques described herein provided for improved visualizations of group communications.

FIG. 17 is an example process 1700 suitable for retrieving and displaying certain group communication items, including media montages, according to some embodiments. The process 1700 provides for communication, at block 1702, between two or more users. For example, the interaction clients 104 can be used by respective users to communicate text, media items, media montages, media overlays, and so on. Some (or all) of the communication at block 1702 includes ephemeral messages. As mentioned above, ephemeral messages are accessible for a limited time duration and include text, media items, media montages, media overlays, and so on.

The process 1700, at block 1704, saves certain of the ephemeral messages. For example, various users of the interaction client can select one or more messages that were communicated in block 1702 and mark them as to-be-saved messages. After a certain time period, all the ephemeral messages except for the to-be-saved messages are then automatically deleted.

In block 1706, the process 1700 retrieves a first set of a media content (e.g., found in the saved ephemeral messages) transmitted by a plurality of interaction clients based on a chronological order. For example, saved messages that are one week old, two weeks old, three weeks old, one month, one year old, and the like, can be retrieved at block 1706. The date used for the chronological order retrieval can be the date of creation of the media content and/or the date of modification, if any, of the media content. The media content can include pictures, video, media overlays, and so on.

In block 1708, the process 1700 creates a visual representation of the first set of media content. For example, a thumbnail representing the newest (or in some cases, the oldest) media content can be created. The thumbnail is sized to fit into a screen or display of the interactive client, such as a touchscreen, a laptop screen, a computer screen, and so on. In block 1710, routine 1700 causes to display, on at least one of the plurality of interaction clients, the visual representation the first set of media content. For example, the thumbnail is displayed on the touchscreen, a laptop screen, a computer screen, and so on, as shown, for example, in FIGS. 7 and 8.

Machine Architecture

Figure 18:
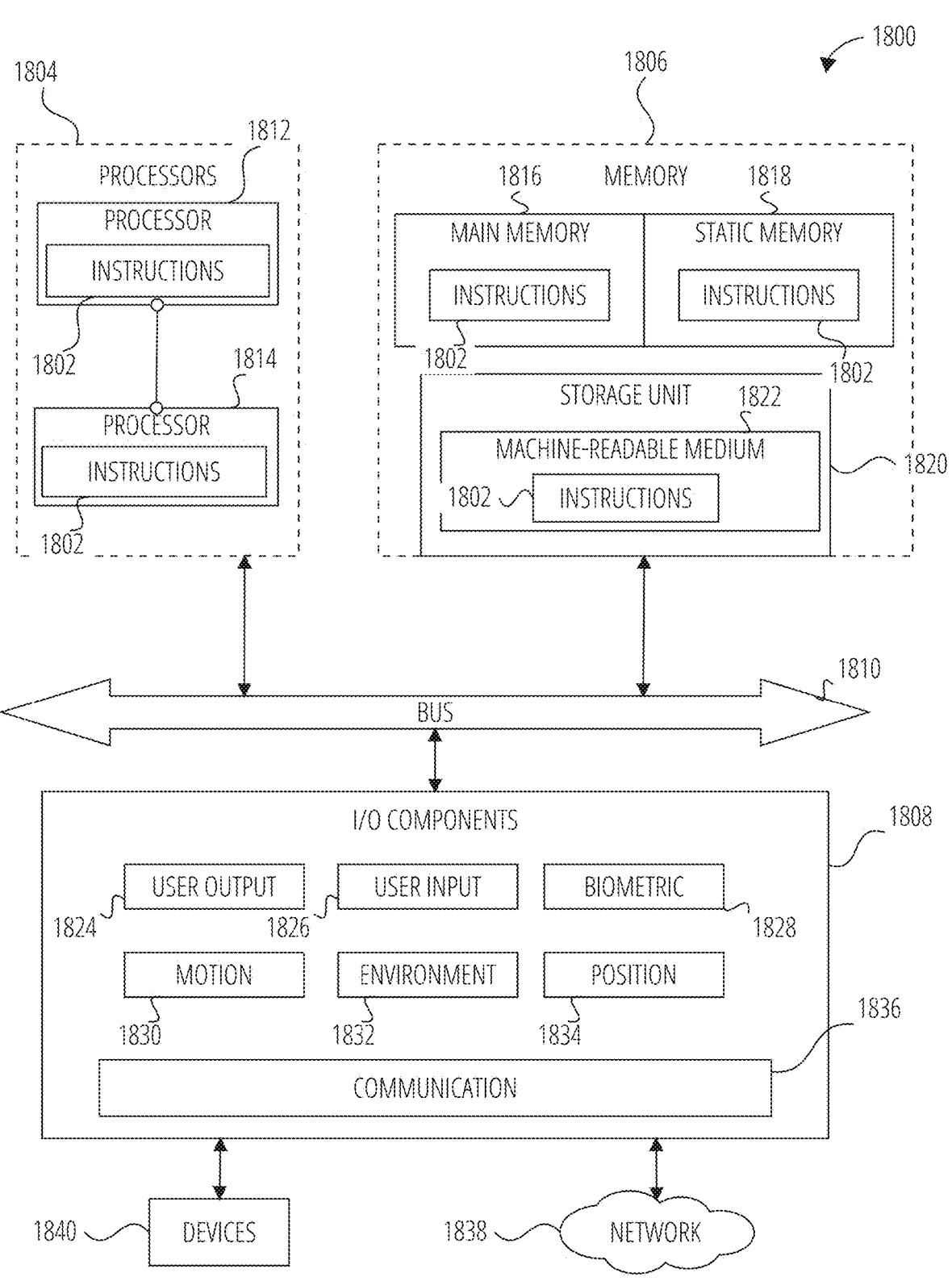
FIG. 18 is a diagrammatic representation of a machine in the form of a computer system within which a set of instructions may be executed to cause the machine to perform any one or more of the methodologies discussed herein, according to some examples.

FIG. 18 is a diagrammatic representation of the machine 1800 within which instructions 1802 (e.g., software, a program, an application, an applet, an app, or other executable code) for causing the machine 1800 to perform any one or more of the methodologies discussed herein may be executed. For example, the instructions 1802 may cause the machine 1800 to execute any one or more of the methods described herein. The instructions 1802 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1802, sequentially or otherwise, that specify actions to be taken by the machine 1800. Further, while a single machine 1800 is illustrated, the term "machine" shall also be taken to include a collection of machines that individually or jointly execute the instructions 1802 to perform any one or more of the methodologies discussed herein. The machine 1800, for example, may comprise the user system 102 or any one of multiple server devices forming part of the interaction server system 110. In some examples, the machine 1800 may also comprise both client and server systems, with certain operations of a particular method or algorithm being performed on the server-side and with certain operations of the particular method or algorithm being performed on the client-side.

The machine 1800 may include processors 1804, memory 1806, and input/output I/O components 1808, which may be configured to communicate with each other via a bus 1810. In an example, the processors 1804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1812 and a processor 1814 that execute the instructions 1802. The term "processor" is intended to include multi-core processors that may comprise two or more independent processors (sometimes referred to as "cores") that may execute instructions contemporaneously. Although FIG. 18 shows multiple processors 1804, the machine 1800 may include a single processor with a single-core, a single processor with multiple cores (e.g., a multi-core processor), multiple processors with a single core, multiple processors with multiples cores, or any combination thereof.

The memory 1806 includes a main memory 1816, a static memory 1818, and a storage unit 1820, both accessible to the processors 1804 via the bus 1810. The main memory 1806, the static memory 1818, and storage unit 1820 store the instructions 1802 embodying any one or more of the methodologies or functions described herein. The instructions 1802 may also reside, completely or partially, within the main memory 1816, within the static memory 1818, within machine-readable medium 1822 within the storage unit 1820, within at least one of the processors 1804 (e.g., within the processor's cache memory), or any suitable combination thereof, during execution thereof by the machine 1800.

The I/O components 1808 may include a wide variety of components to receive input, provide output, produce output, transmit information, exchange information, capture measurements, and so on. The specific I/O components 1808 that are included in a particular machine will depend on the type of machine. For example, portable machines such as mobile phones may include a touch input device or other such input mechanisms, while a headless server machine will likely not include such a touch input device. It will be appreciated that the I/O components 1808 may include many other components that are not shown in FIG. 18. In various examples, the I/O components 1808 may include user output components 1824 and user input components 1826. The user output components 1824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1808 may include biometric components 1828, motion components 1830, environmental components 1832, or position components 1834, among a wide array of other components. For example, the biometric components 1828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1830 include acceleration sensor components (e.g., accelerometer), gravitation sensor components, rotation sensor components (e.g., gyroscope).

The environmental components 1832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1808 further include communication components 1836 operable to couple the machine 1800 to a network 1838 or devices 1840 via respective coupling or connections. For example, the communication components 1836 may include a network interface component or another suitable device to interface with the network 1838. In further examples, the communication components 1836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1840 may be another machine or any of a wide variety of peripheral devices (e.g., a peripheral device coupled via a USB).

Moreover, the communication components 1836 may detect identifiers or include components operable to detect identifiers. For example, the communication components 1836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1836, such as location via Internet Protocol (IP) geolocation, location via Wi-Fi® signal triangulation, location via detecting an NFC beacon signal that may indicate a particular location, and so forth.

The various memories (e.g., main memory 1816, static memory 1818, and memory of the processors 1804) and storage unit 1820 may store one or more sets of instructions and data structures (e.g., software) embodying or used by any one or more of the methodologies or functions described herein. These instructions (e.g., the instructions 1802), when executed by processors 1804, cause various operations to implement the disclosed examples.

The instructions 1802 may be transmitted or received over the network 1838, using a transmission medium, via a network interface device (e.g., a network interface component included in the communication components 1836) and using any one of several well-known transfer protocols (e.g., hypertext transfer protocol (HTTP)). Similarly, the instructions 1802 may be transmitted or received using a transmission medium via a coupling (e.g., a peer-to-peer coupling) to the devices 1840.

Software Architecture

Figure 19:
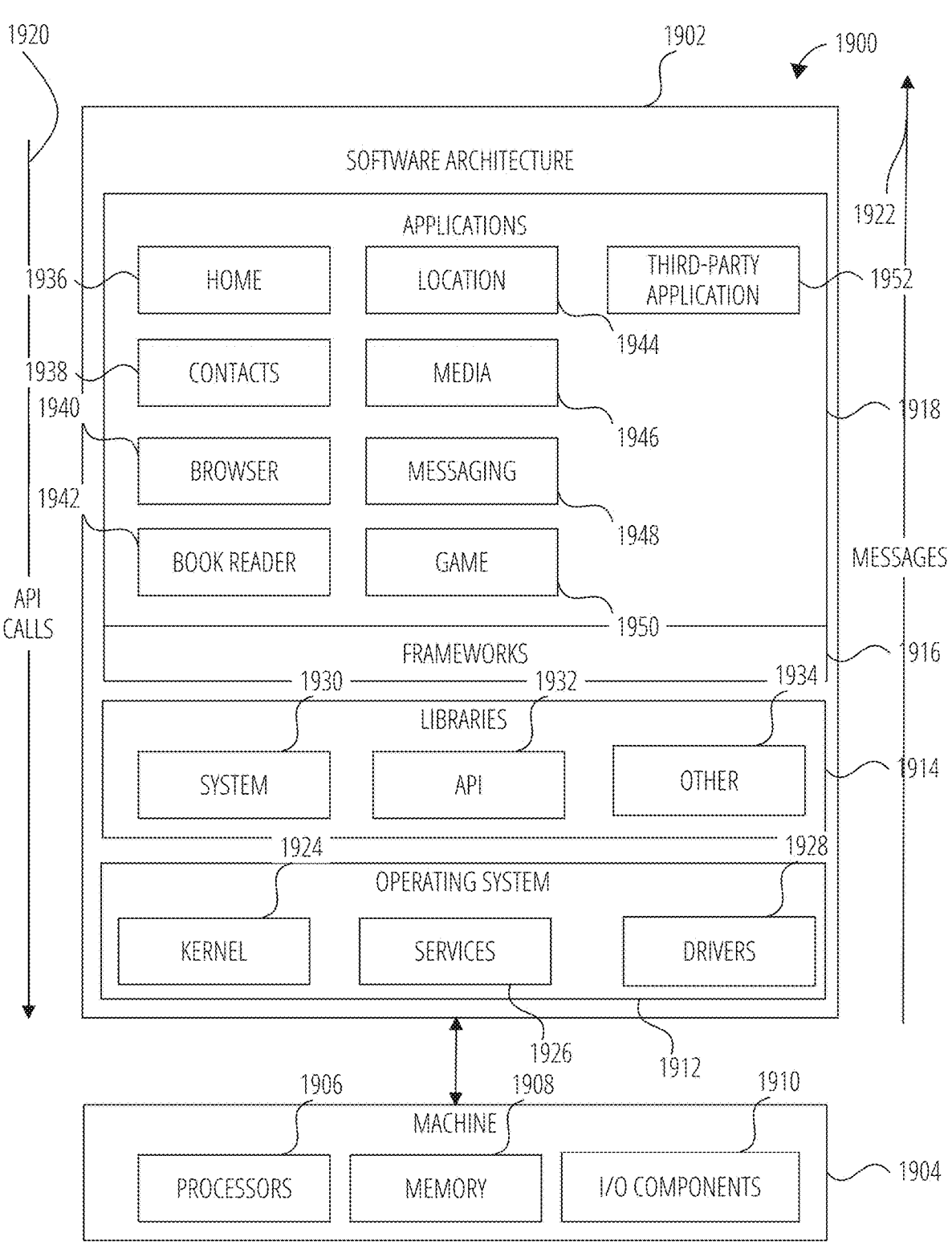
FIG. 19 is a block diagram showing a software architecture within which examples may be implemented.

FIG. 19 is a block diagram 1900 illustrating a software architecture 1902, which can be installed on any one or more of the devices described herein. The software architecture 1902 is supported by hardware such as a machine 1904 that includes processors 1906, memory 1908, and I/O components 1910. In this example, the software architecture 1902 can be conceptualized as a stack of layers, where each layer provides a particular functionality. The software architecture 1902 includes layers such as an operating system 1912, libraries 1914, frameworks 1916, and applications 1918. Operationally, the applications 1918 invoke API calls 1920 through the software stack and receive messages 1922 in response to the API calls 1920.

The operating system 1912 manages hardware resources and provides common services. The operating system 1912 includes, for example, a kernel 1924, services 1926, and drivers 1928. The kernel 1924 acts as an abstraction layer between the hardware and the other software layers. For example, the kernel 1924 provides memory management, processor management (e.g., scheduling), component management, networking, and security settings, among other functionalities. The services 1926 can provide other common services for the other software layers. The drivers 1928 are responsible for controlling or interfacing with the underlying hardware. For instance, the drivers 1928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1914 provide a common low-level infrastructure used by the applications 1918. The libraries 1914 can include system libraries 1930 (e.g., C standard library) that provide functions such as memory allocation functions, string manipulation functions, mathematic functions, and the like. In addition, the libraries 1914 can include API libraries 1932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1914 can also include a wide variety of other libraries 1934 to provide many other APIs to the applications 1918.

The frameworks 1916 provide a common high-level infrastructure that is used by the applications 1918. For example, the frameworks 1916 provide various graphical user interface (GUI) functions, high-level resource management, and high-level location services. The frameworks 1916 can provide a broad spectrum of other APIs that can be used by the applications 1918, some of which may be specific to a particular operating system or platform.

In an example, the applications 1918 may include a home application 1936, a contacts application 1938, a browser application 1940, a book reader application 1942, a location application 1944, a media application 1946, a messaging application 1948, a game application 1950, and a broad assortment of other applications such as a third-party application 1952. The applications 1918 are programs that execute functions defined in the programs. Various programming languages can be employed to create one or more of the applications 1918, structured in a variety of manners, such as object-oriented programming languages (e.g., Objective-C, Java, or C++) or procedural programming languages (e.g., C or assembly language). In a specific example, the third-party application 1952 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1952 can invoke the API calls 1920 provided by the operating system 1912 to facilitate functionalities described herein.

EXAMPLES

Example 1 is a method including . . .

In Example 2, the subject matter of Example 1 including . . .

In Example 3, the subject matter of Examples 1-2 including . . .

In Example 4, the subject matter of Examples 1-3 including . . .

In Example 5, the subject matter of Examples 1-4 including . . .

Example 10 is an apparatus comprising means to implement of any of Examples 1-5.

Example 11 is a system to implement of any of Examples 1-5.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system, comprising:
one or more hardware processors; and
at least one memory storing instructions that cause the one or more hardware processors to perform operations comprising:
receiving a selection, from at least one user of a plurality of interaction clients, to save a first set of media content as part of communications of messages between a plurality of users;
creating a visual representation of the first set of the media content based on the first set of the media content retrieved based on a chronological order of the media content over a predefined range of time;
causing to display, on at least one of the plurality of interaction clients, the visual representation the first set of media content based on the chronological order of the media content over the predefined range of time;
determining the display of the visual representation is in a state, the state including one of an unread state, partially read state, or read state; and
controlling playback of the first set of media content in accordance with the determined state, including autorotating the first set of media content in the unread state and maintaining the first set of media content in a non-autorotating mode in the partially read state.

2. The system of claim 1, wherein the first set of media content is saved based on users of the plurality of interaction clients marking one or more of the messages as to-be saved messages.

3. The system of claim 2, wherein the operations comprise automatically deleting, after a certain time period, all messages except the to-be-saved messages.

4. The system of claim 1, wherein the operations comprise displaying a visual indicia that the retrieved first set of media content is ready for viewing.

5. The system of claim 4, wherein the visual indicia is disposed on one or more avatars of creators of the first set of media content.

6. The system of claim 5, wherein the operations that comprise causing the display, on at least one of the plurality of interaction clients, the visual representation the first set of media content, comprise receiving a touch gesture on a row of a screen displaying the one or more avatars to initiate the display of the visual representation of the first set of media content.

7. The system of claim 1, wherein the operations comprise displaying the first set of media content when receiving a touch gesture on the visual representation of the first set of media content.

8. The system of claim 1, wherein the operations comprise displaying a visual indication of viewing progress of the first set of media content.

9. The system of claim 8, wherein the visual indication comprises a progress bar displayed on top of the visual representation of the first set of media content.

10. The system of claim 1, wherein the operations for causing to display, on at least one of the plurality of interaction clients, the visual representation the first set of media content comprise operations for displaying on a group chat screen the visual representation of the first set of media content, a list of group members, and a map for locating group members that have shared their location information.

11. The system of claim 1, wherein the operations for causing to display, on at least one of the plurality of interaction clients, the visual representation the first set of media content comprise operations for displaying on a friend screen the visual representation of the first set of media content, user information related to a user friend, and a map for locating the user friend.

12. The system of claim 1, comprising operations that remove a first media content from the first set of media content in selected interaction clients of the plurality of interaction clients and that display a resulting first set of media content as a second set of media content in the selected interaction clients.

13. The system of claim 12, wherein the operations that comprise removing a first media content from the first set of media content comprise operations for allowing only a creator of the first media content to remove the first media content from the first set of media content.

14. The system of claim 12, wherein the selected interaction clients comprise all of the plurality of interaction clients.

15. The system of claim 12, wherein the operations comprise displaying a textual message indicating that the first media content has been removed on a screen of the selected interaction clients.

16. The system of claim 1, wherein the operations comprise receiving a reply, from the at least one of the plurality of interaction clients, to the visual representation the first set of media content, and displaying the reply on a screen of a selected set of the plurality of interaction clients.

17. The system of claim 1, wherein the visual representation the first set of media content is displayed within a group chat screen.

18. A method comprising:
receiving a selection, from at least one user of a plurality of interaction clients, to save a first set of media content as part of communications of messages between a plurality of users;
creating a visual representation of the first set of the media content based on the first set of the media content retrieved based on a chronological order of the media content over a predefined range of time;
causing to display, on at least one of the plurality of interaction clients, the visual representation the first set of media content based on the chronological order of the media content over the predefined range of time;
determining the display of the visual representation is in a state, the state including one of an unread state, partially read state, or read state; and
controlling playback of the first set of media content in accordance with the determined state, including autorotating the first set of media content in the unread state and maintaining the first set of media content in a non-autorotating mode in the partially read state.

19. A non-transitory computer-readable storage medium storing instructions that, when executed by at least one processor, cause the at least one processor to perform operations comprising:
receiving a selection, from at least one user of a plurality of interaction clients, to save a first set of media content as part of communications of messages between a plurality of users;

creating a visual representation of the first set of the media
content based on the first set of the media content
retrieved based on a chronological order of the media
content over a predefined range of time;
causing to display, on at least one of the plurality of
interaction clients, the visual representation the first set
of media content based on the chronological order of
the media content over the predefined range of time;
determining the display of the visual representation is in
a state, the state including one of an unread state,
partially read state, or read state; and
controlling playback of the first set of media content in
accordance with the determined state, including autoro-
tating the first set of media content in the unread state
and maintaining the first set of media content in a
non-autorotating mode in the partially read state.

\* \* \* \* \*